United States Patent [19]

Oldfield

[11] Patent Number: 4,827,798
[45] Date of Patent: May 9, 1989

[54] APPARATUS AND METHOD FOR EXERTING A BRAKING TORQUE UPON A VEHICLE

[75] Inventor: Thomas A. Oldfield, Columbus, Ind.

[73] Assignee: Anchor Tech., Inc., Columbus, Ind.

[21] Appl. No.: 58,358

[22] Filed: Jun. 4, 1987

[51] Int. Cl.[4] .................... F16H 47/04; F16H 37/06; F16D 57/02; B60K 41/26

[52] U.S. Cl. ........................................ 74/687; 74/705; 188/291; 192/4 A

[58] Field of Search ............... 188/290, 291; 192/4 A, 192/4 B; 74/675, 687, 705, 720, 718, 794

[56] References Cited

U.S. PATENT DOCUMENTS

| | | | |
|---|---|---|---|
| 1,212,302 | 1/1917 | Wilder | 188/291 |
| 2,147,932 | 5/1936 | Smith | 188/291 X |
| 2,215,058 | 9/1940 | Van Maren | 188/295 |
| 2,323,252 | 2/1941 | Mathey | 361/366 |
| 2,361,739 | 10/1944 | Bobst | 188/295 |
| 2,415,670 | 2/1947 | Black et al. | 188/291 |
| 2,544,606 | 3/1951 | Mallory | 180/302 |
| 2,864,473 | 12/1958 | Christenson et al. | 192/4 B |
| 3,033,322 | 9/1957 | Hughes | 188/247 |
| 3,062,327 | 11/1962 | Debus | 188/290 X |
| 3,103,997 | 9/1963 | Shealy et al. | 192/4 B |
| 3,132,533 | 5/1964 | Baker | 74/687 |
| 3,216,536 | 11/1965 | Henschel | 188/290 X |
| 3,236,338 | 2/1966 | Mayer | 188/290 X |
| 3,597,998 | 8/1971 | Ebert | 74/687 |
| 3,683,719 | 8/1972 | Gros | 74/720 X |
| 3,834,985 | 9/1974 | Gullberg | 74/687 X |
| 3,859,970 | 1/1975 | Dreisin | 123/97 B |
| 4,114,734 | 9/1978 | Bultmann | 188/274 |
| 4,271,796 | 6/1981 | Sickler et al. | 123/321 |
| 4,572,114 | 2/1986 | Sickler | 123/21 |

FOREIGN PATENT DOCUMENTS

| | | | |
|---|---|---|---|
| 0101118 | 9/1925 | Austria | 188/291 |
| 0855852 | 5/1940 | France | 188/291 |
| 0623032 | 8/1978 | U.S.S.R. | 188/290 |

Primary Examiner—Dirk Wright
Assistant Examiner—Harold F. Macris
Attorney, Agent, or Firm—Woodard, Emhardt, Naughton Moriarty & McNett

[57] ABSTRACT

A device for providing a retarding force against the motion of a vehicle, which device does not intrude upon the engine, is not dependent upon the gear selected, and does not exhibit fade or skid characteristics. A torque limit clutch engages a ground engaging wheel of the vehicle with a first aerodynamic rotor. In one embodiment, the ratio of the speed of the aerodynamic rotor as compared to the speed of the ground engaging wheel is controlled by a serially connected variable-ratio gearbox. In another embodiment, the ratio is controlled by an epicyclic gear train, a second aerodynamic rotor and a pump.

38 Claims, 6 Drawing Sheets

APPARATUS AND METHOD FOR EXERTING A BRAKING TORQUE UPON A VEHICLE

FIELD OF THE INVENTION

This invention relates to the field of vehicle braking systems, and in particular to a braking system using aerodynamic rotors to exert a constant or operator controlled retarding force upon a vehicle.

BACKGROUND OF THE INVENTION

When a large, fully loaded semi-trailer (which weights about 80,000 lbs.) descends a 6° downgrade at highway speeds for one or two miles, some form of braking other than the trucks own service brakes are generally required to avoid a runaway. Although some of the potential energy of the truck is absorbed by engine work, aerodynamic drag, rolling resistance, etc., the service brakes and/or retarder will be called upon to absorb about 400 hp at 40 m.p.h. and 700 hp at 80 m.p.h. While service brakes can apply enough torque to skid the wheels initially, their effectiveness decreases rapidly as they absorb energy and heat up. The vehicle may then regain speed requiring more braking resulting in further brake loss. An on-off, systematic application of the service brakes may be sufficient to control the semi without overheating, but there is still a fairly great risk of fade and complete brake loss.

Numerous braking systems have been developed to assist the truck's service brakes, the most notable of which is the "Jacob's brake" which is described in U.S. Pat. No. 4,572,114. The Jacob's brake is a compression release engine retarder which temporarily disables the normal operation of the engine and converts the standard four stroke cycle engine into an air compressor for developing a retarding horsepower. Although representing a significant addition to the service brakes of a vehicle, the compression release engine retarder has serious drawbacks. First, the compression release brake, and similar systems interfaced with the engine, produce a force which is limited by the size and rpm capability of the engine. These brakes can only provide the needed amount of retardation force over long and/or steep grades with the vehicle at a relatively slow speed and with the compression release brake operated at a high engine r.p.m. Once engaged, it is difficult if not impossible to shift into a lower gear.

Another system, the hydraulic retarder, has a large power capability and is easy to control. However, dissipation of the braking energy is commonly done through the vehicle's own cooling system. This severely limits the retarder performance, complicates the installation and makes these systems more expensive than the compression release system.

Yet another system, the electrical brake system, though providing a noticeable braking addition, has become unpopular due to cost, weight, fade and inertia factors, especially on the larger on-highway trucks.

Another vehicle braking system which is not interfaced with the engine is disclosed in Bultmann, U.S. Pat. No. 4,114,734. The Bultmann device has two oppositely rotating and opposing rotors coupled directly to the drive shaft of a vehicle. The Bultmann device, however, requires a separate cooling system to dissipate the heat generated by the rotors. It also is not capable of producing a constant or operator regulated retardant force.

Under current EEC legislation (European Economic Community), laden vehicles shall be tested in such a manner that the vehicle's braking system be able to withstand a braking input on a 6% downward grade for 6 km at 30 kph. What is needed is a device which meets this retarding force at all speeds down to zero, without face, in continuous operation and without service brake assistance. Furthermore, the device should be non-intrusive upon the engine, compact and inexpensive, applicable to all vehicles regardless of their engine size and be capable of integration into the vehicle transmission and/or the axle systems.

SUMMARY OF THE INVENTION

Generally speaking, there is provided a self-contained device for retarding the motion of a vehicle, at all speeds, without fade, without intruding upon the engine and without being dependant upon the vehicle's speed or gear shift apparatus for its output force. According to one embodiment, a retarder has a torque limit clutch, an epicyclic gear train having two output shafts, an aerodynamic rotor mounted at the end of each shaft, and a pump integrally connected to one of the output shafts. In practice, the torque limit clutch engages the retarder with a ground engaging wheel of the vehicle. Rotation of the ground engaging wheel is transmitted through the epicyclic gear train to the aerodynamic rotors. Modulation of the pump regulates the speed of rotation of one rotor, thus modulating the speed of the other rotor through the epicyclic and thus controlling the retarding torque.

According to another embodiment, a retarder has a torque limit clutch, two or more aerodynamic rotors, one or more epicyclic gear trains and a single pump integrally engagable with each rotor. Engagement of the torque limit clutch causes rotational input from a ground engaging wheel to be transmitted to the first of the serially connected epicyclic gear trains. The first of two outputs of each gear train is in input of the next gear train. One rotor is mounted at the end of the second output of each gear train. The retarding torque of the retarder may be precisely controlled by locking/unlocking each rotor and by engagement and modulation of the pump in connection with one of the unlocked rotors.

According to another embodiment, a retarder has a torque limit clutch, a variable ratio gearbox, a fixed ratio gearbox, several aerodynamic rotors, each engageably driveable via a clutch, and a pump. Engagement of the torque limit clutch causes rotational input from a ground engaging wheel to drive the variable ratio gearbox which produces a variable rotational output to drive the pump and the fixed ratio gearbox. The fixed ratio gearbox has several output shafts, each connected to an aerodynamic rotor by a clutch. A varying retarding torque may be produced by changing the ratio of the variable ratio gearbox and by selectively engaging one or more of the rotors. The torque required by the variable ratio gearbox to drive the pump is variable via a controlled relief valve so that the output retarding torque may be even more precisely controlled.

Another embodiment is provided wherein the pump of the previous embodiment is a variable displacement pump which drives a motor. The motor drives one input of a two input epicyclic gearbox, the second input being driven by the variable ratio gearbox. The epicyclic gearbox then drives the fixed ratio gearbox. Modulation of the variable displacement pump provides precise control of the retarding torque of the rotors.

It is an object of the present invention to provide an improved retarder.

Another object of the present invention is to provide a retarder for vehicles capable of providing a constant retarding torque at all speeds irrespective of grade or duration of engagement.

It is a further object of the present invention to provide a retarder for vehicles which is not intrusive or dependant upon the engine or gear shifting components for its effectiveness.

It is still a further object of the present invention to provide a retarding system for a vehicle which is independent of engine size.

Another object of the present invention is to provide a self-contained, fade-free retarding system that has in itself no limit to its ability to dissipate the braking energy.

A further object of the present invention is to provide a retarder which provides anti-skid protection.

These and further objects of the invention will become apparent from the following description.

DESCRIPTION OF THE PREFERRED EMBODIMENT

Figure 1:
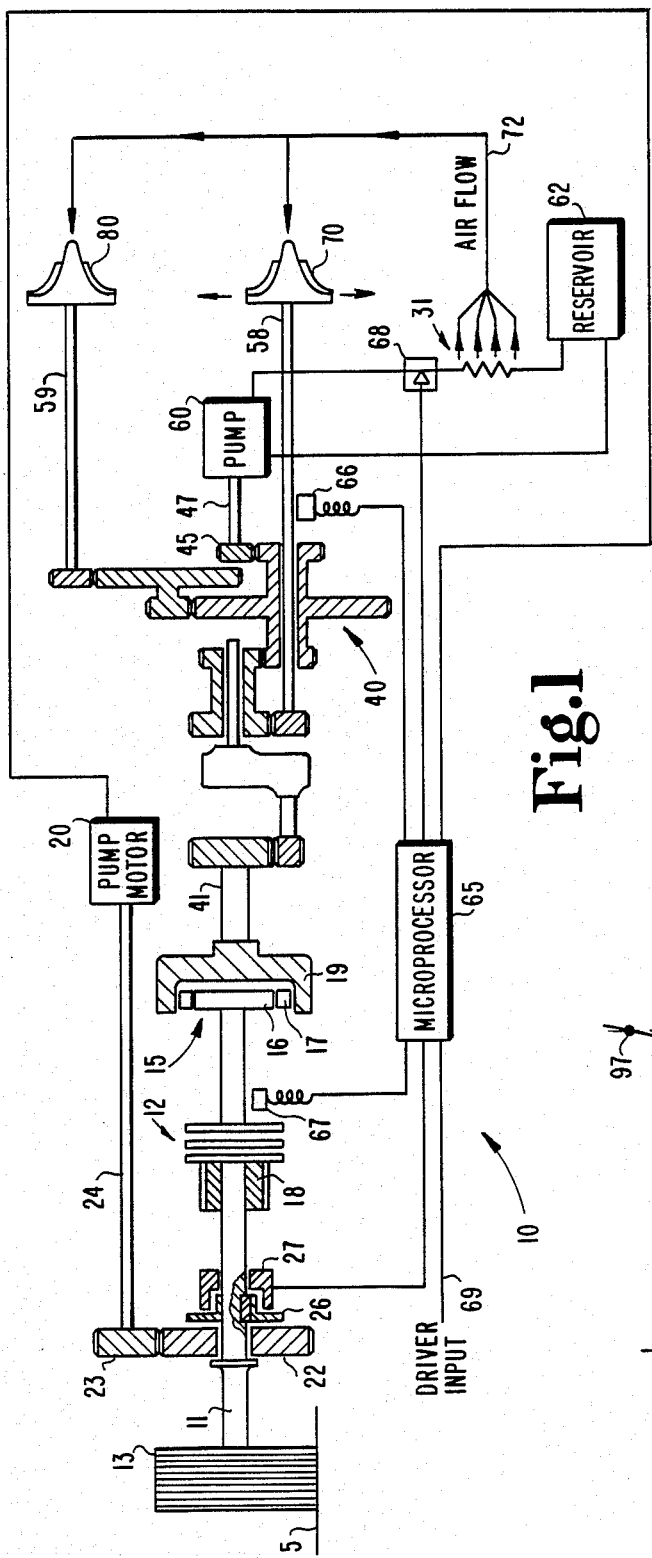
FIG. 1 is a diagrammatic view of the retarder in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a retarder system 10 in accordance with one embodiment of the present invention. It is driven by input shaft 11 which is engaged with and driven by any member of the vehicle which is engaged with ground 5. It may be engaged directly with the transmission drive shaft or it may be driven by a single axle. If the system is used on a train or other vehicle which travels by rail, the input shaft would be integrated with a wheel engaged with a braking rail. In the preferred embodiment, shaft 11 is driven by a single axle, but for purposes of description, system 10 will be described as engaged with a single wheel 13 of a vehicle (not shown). System 10 is selectively engaged with ground engaging wheel 13 of the vehicle by a torque limiting friction clutch 12. Clutch 12 provides direct engagement between shaft 11 and the remainder of the system when the torque felt by clutch 12 is below a pre-selected level. When the magnitude of torque exceeds the pre-selected level, clutch 12 slips, transmitting only the maximum pre-selected torque and corresponding rotation. The remainder of retarder system 10 includes a sprag clutch 15, a regenerative pump/motor 20, an epicyclic gear train 40, a control pump 60, first aerodynamic rotor 70, and second aerodynamic rotor 80. A retarding torque is created by rotation of first aerodynamic rotor 70. The precise value of that retarding torque is regulated, through microprocessor 65, by the control means of the present embodiment, which includes gear train 40, second aerodynamic rotor 80 and pump 60. The retarding torque is transmitted through system 10 to ground engaging wheel 13 where, via friction with ground surface 5, a retarding force is exerted upon the vehicle.

For purposes of description, positive rotation, movement, reaction or torque as used herein shall refer to the direction of rotation, movement, reaction or torque of any element which, if engaged with ground engaging wheel 13, is consistent with the rotation of that wheel for forward motion of the vehicle.

Sprag clutch 15 is typical of overrunning clutches which automatically engage in one direction and free wheel in the other. Upon engagement of clutch 12, for a positive rotational input from shaft 11, driving member 16 will be caused to rotate (clockwise, for example). Contact of driving member 16 with sprags 17 causes sprags 17 to lock-up in frictional engagement with the driven member 19. Driving member 16, sprags 17 and driven member 19 then rotate as a unit so long as the angular velocity of driven member 19 does not exceed the angular velocity of driven member 16, at which time no force is transmitted between members 16 and 19 (except for infinitesimal forces from the sliding sprags).

Driven member 19 drives epicyclic input shaft 41 of gear train 40. Gear trains such as gear train 40, having first and second output shafts 58 and 59, are well known. Rigidly, axially mounted at the end of first and second output shafts 58 and 59 are first and second aerodynamic rotors 70 and 80, respectively. Gear train 40 also includes pinion 45 which rotates in direct rotational proportion with second output shaft 59. Rotation of pinion 45, and thus shaft 59 and rotor 80, is modulated by pump 60 via rigidly interconnecting shaft 47.

Figure 2:
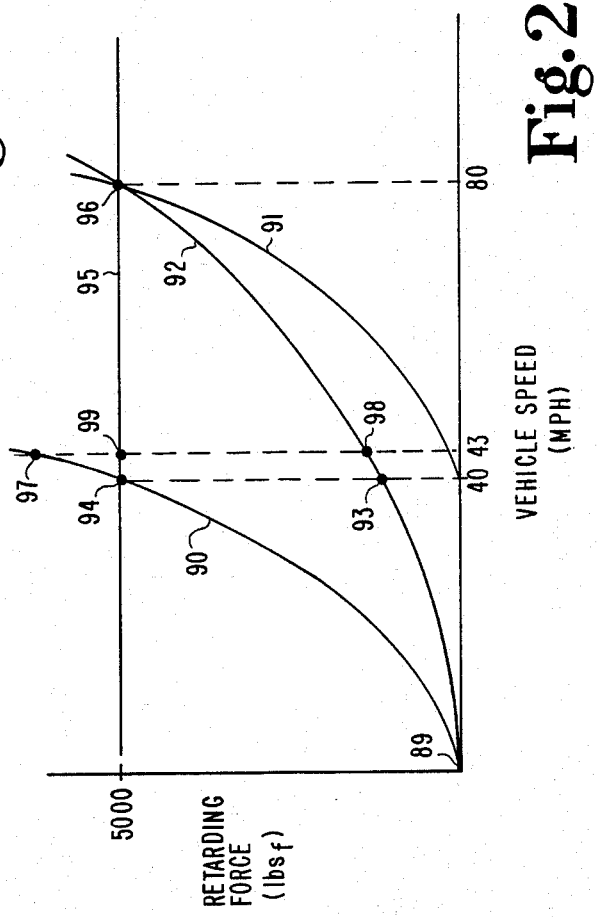
FIG. 2 is a graph illustrating the relationship of speed of the vehicle to braking force produced by the retarder of FIG. 1.

Rotors 70 and 80 are aerodynamic rotors, each of which includes an impeller and an inducer of a type commonly found in turbochargers. Rotors 70 and 80 may be centrifugal compressors. The torque required to operate one such rotor is approximately proportional to the square of the angular velocity of the rotor. The torque required to rotate one rotor is employed by the present invention as the retarding force resistive to the input from ground engaging wheel 13. Curve 90 in FIG. 2 shows the relationship for one such rotor of retarder system 10 with the resultant retarding or braking force to the vehicle plotted as a function of the speed of the vehicle.

If a given single aerodynamic rotor where engaged when the vehicle was traveling at a given speed (40 m.p.h. for example), a retarding force (5,000 lb. for example) would be exerted by that rotor, through system 10 and upon ground engaging wheel 13. As the vehicle slows, the retarding force would decay rapidly at a rate proportional to twice the velocity (curve 90). For speeds greater than 40 m.p.h., engagement would also be possible with the same system configuration. However, due to the square law relationship, the resulting retarding force from engagement at just 45 m.p.h., for example, would be about 1,300 lbs. higher which could result in damage to the system due to exceeding the stress limits. (Assuming that the maximization of components had resulted in the most compact rotor operable within the given parameters.) Conversely, if a single aerodynamic rotor were used to produce the desired maximum breaking force (5,000 lbs.) at 80 m.p.h., the resulting system would be substantially ineffective at lower speeds as its retarding capabilities decrease rapidly as the vehicle's speed decreases (similar to curve 92, FIG. 2).

The retarding system shown in FIG. 1, using two aerodynamic rotors, does provide constant braking force over the desired broad speed range. The braking force/m.p.h. relationship of a second, identical aerodynamic rotor 80, operable within the same speed range (40 m.p.h.), is shown by curve 91 in FIG. 2. And, epicyclic gear trains such as gear train 40 are torque balancing. That is, for a given input torque, the torque seen by shaft 58 will equal that of shaft 59. Since shaft 47 is operatively engaged with shaft 59, the sum of torques from shafts 47 and 59 will equal that of shaft 58. If pump 60 offers zero pressure, thus zero torque applied to shaft 47, then the torques of shafts 58 and 59 will be equal. Their speeds will also be equal due to this identical size of rotors 70 and 80 and the gear sizes of gear train 40. The braking force produced by the combined, free rotation of rotors 70 and 80 would be as shown by curve 92 in FIG. 2. Thus, at 40 m.p.h., for example, if both rotors are free to rotate, the braking force will be at a level indicated by point 93. If pump 60 holds rotor 80 fixed, causing rotor 70 to rotate at full speed, the braking force will be along curve 90 at point 94. Adjustment of pump 60 to permit some rotation of pinion 45, and thus rotor 80, will produce a braking force somewhere between points 93 and 94. It can readily be seen then, that for a given vehicle speed between 40 m.p.h. and 80 m.p.h., modulation of pump 60 can produce a braking force anywhere between curves 90 and 92. It can also be seen that a constant braking force, 5,000 lbs., for example, as indicated along line 95, can be produced by appropriate modulation of pump 60.

Modulation of pump 60 is done by a standard control valve 68 which modulates the fluid pressure flowing from pump 60 to reservoir 62 and which ultimately controls the speed of rotation of shaft 47. Modulation of control valve 68 is governed solely by microprocessor 65, the input from which comes from speed sensors 66 and 67 engaged with and reading the speed of shaft 58 and driving member 16, respectively. Microprocessor 65 could be programmed to maintain a constant braking force from retarder system 10 whenever system 10 is engaged. Microprocessor 65 may also be designed to allow for driver input 69, permitting the driver to command a retarding force anywhere below line 95.

Additionally, any value below curve 92 may be produced by repetitive on/off engagement of clutch 12.

Rotors 70 and 80 have sufficient angular momentum such that they will not slow down to a stop for several seconds upon disengagement, depending, of course, upon the size of rotors 70 and 80 and the speed at which they are disengaged. Thus, appropriate programming of microprocessor 65 to control pump 60 and clutch 12 can produce smooth cyclic engagement/disengagement of system 10 to produce valves below curve 92.

Assuming that the components are sized to produce the values shown in FIG. 2, the gear train, dual rotor, pump combination and microprocessor 65 work as follows:

For vehicle speeds between 0 and 40 m.p.h., engagement of retarder system 10 produces a braking force, shown by curve 90, with a maximum braking force of 5,000 lbs. (point 94). Speed sensor 67 relays signals corresponding to the input speed of 40 m.p.h. or less to microprocessor 65 which then commands pump 60 to completely preclude rotation of pinion 45, and thus rotor 80. The braking force of retarder system 10, as a function of m.p.h., will be produced solely by rotor 70 and will be along curve 90. Addition of a second pump 20 (described herein) could be added to maintain a maximum braking force for speeds below 40 m.p.h.

Ignoring standard relief valves on pump 60 and the effect of torque limit clutch 12 (described herein), next considered is the situation where the retarder system 10 is engaged when the vehicle is traveling faster than 40 mph (43 mph, for example). A maximum retarding force of approximately 5,800 lbs. could be produced if pump 60 were to hold rotor 80 completely idle leaving only rotor 70 to rotate (point 97). If pump 60 permitted free rotation of rotor 80, the retardation force would be as indicated at point 98 on curve 92. Instead, speed sensor 67 relays the input speed to microprocessor 65 which then commands pump 60 to exert only so much pressure against rotation of shaft 47 and pinion 45. The remainder of torque needed to balance the torque of rotating shaft 58 within gear train 40 is produced by the rotation of rotor 80. By proper programming of microprocessor 65, the retarding force seen by shaft 11 is always along line 95. Engagement of retarder 10 closer to 80 m.p.h. signals microprocessor 65 to command very little resistance from pump 60, the bulk of the balancing torque coming from rotor 80.

If the retarder system 10 is engaged when the vehicle is traveling at or above 80 m.p.h., microprocessor 65 now tells pump 60 to offer no resistance to rotor 80, the two rotors operate freely and the torque of shaft 59 exactly balances the torque of shaft 58. The retarding force produced is along curve 92 up to line 95. (Torques corresponding to force values above line 95 are not transmitted to gear train 40 due to torque limit clutch 12 described herein.)

One primary advantage of the retarder system 10 described herein is its ability to dissipate the braking energy. Rather than require separate cooling means, the aerodynamic rotors convert the majority of the braking energy to work by increasing the kinetic energy of the air which is then dumped into the atmosphere. Any parasitic heat which is built up within system 10 can be removed by adding heat exchangers 31 which operate by drawing the rotor intake air 72 past the pump's oil flow. The higher temperature intake air to the rotors will also improve the efficiency of retarder system 10. Volutes may be added to convert the kinetic energy of the high speed outlet air into compressed air for purposes such as supplementing the air supply for the vehicle's own service brakes and for service braking cooling.

In practice, system 10 is engaged by torque limit clutch 12. Torque limit clutches such as clutch 12 are well known and will transfer the entire load between input shaft 11 and driving member 16 of sprag clutch 15 until a pre-selected torque limit is reached. If the pre-selected torque limit of X ft-lbs. (an amount which corresponds with a retarding force of 5,000 lbs., for example) is exceeded, slippage will occur within clutch 12 so that only X ft-lbs. are transferred to sprag clutch 15. Upon initial engagement, even if the vehicle speed is less than 40 m.p.h. (FIG. 2), the corresponding braking force level may momentarily start to exceed the value (5,000 lbs.) corresponding with the pre-selected torque limit (X) as the rotors attempt to match the vehicle speed. The torque limit clutch 12 (in conjunction with conventional pressure relief control of pump 60) prevents the torque from exceeding the limit (X) during this initial peak, preventing possible damage to the system. Thus, when system 10 is engaged, regardless of the vehicle speed, the torque limit clutch prevents the braking or retarding force from exceeding line 95 (FIG. 2). As the vehicle then begins to slow, microprocessor 65 modulates pump 60 as described above to maintain the retarding force up to line 95. To prevent initial engagement shock and to further ensure a "smooth engagement", a torsion coupling 18 is provided between input shaft 11 and clutch 12.

If, during retard and service braking, the input from input shaft 11 stopped or slowed drastically due to skidding, service brake lock or hydroplaning, for example, the retarding force would automatically stop since driven member 19 of sprag clutch 15 would overrun driving member 16. As the kinetic energy of the system is dissipated, the speed of driven member 19 will slow until there is again input from input shaft 11 or until the input seen by driving member 16 equals that of driven member 19. The same "smooth engagement" principles operating during initial engagement also act here during skidding-type situations to provide an overall smooth retarding operation.

In the preferred embodiment, regenerative pump/motor 20 is provided for engagement directly with input shaft 11 to complete the range of constant retarder force for urban driving. Rotating freely about shaft 11 is gear 22 which meshes with gear 23 which is rigidly, coaxially connected to the output shaft 24 of regenerative pump/motor 20. Clutch plate 26, splined to rotate with but slide along shaft 11, can be frictionally engaged with gear 22 by activator 27 which responds to signals from microprocessor 65. Referring to FIG. 2, when the vehicle speed drops below 40 and the retarding force produced by rotor 70 decays along curve 90, pump/motor 20 can be engaged to provide additional braking force up to line 95. In the preferred embodiment, pump/motor 20 is regenerative, being capable of storing the braking energy in an accumulator and using it to subsequently accelerate the vehicle. Such application is described in *Discover*, "Using Your Brakes Can Help You Get Going", July, 1986, page 10. The regenerative system would also be controlled by microprocessor 65.

Figure 7:
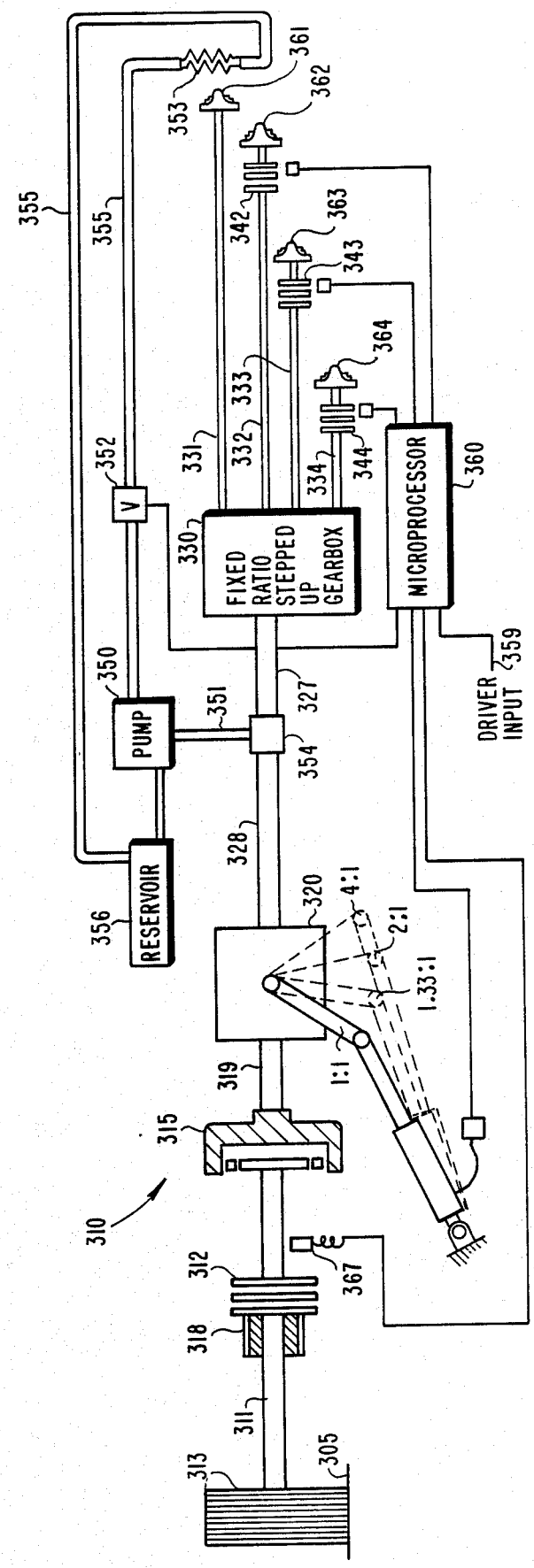
FIG. 7 is a diagrammatic view of a retarder in accordance with another embodiment of the present invention.

In another embodiment shown in FIG. 7 a plurality of aerodynamic rotors 361, 362, 363 and 364 are selectively engageable, the torques produced by each rotor being directly addable within fixed ratio stepped up gearbox 330 to create the total retarding torque. As with retarder 10 of FIG. 1, retarder 310 is driven by and exerts a retarding torque upon road engaging wheel 313 via shaft 311. Retarder 310 is selectively engaged with wheel 313 by torque limit clutch 312. Axially connected torsion coupling 318 and sprag clutch 315 insure smooth engagement and provide a rapid step change in braking effort. Output shaft 319 of sprag clutch 315 is the input to variable ratio gearbox 320. Output shaft 328 of gearbox 320 drives gearbox 354 which drives conventional fixed ratio stepped-up gearbox 330 via shaft 327 and pump 350 via shaft 351. The four output shafts 331, 332, 333 and 334 of gearbox 330 are all driven by gearbox 330 to rotate at the same speed. Gearbox 330 is of the type that the sum of the torques of output shafts 331, 332, 333 and 334 is equal to the torque of shaft 327 coming into gearbox 330. Aerodynamic rotor 361 is rigidly connected at the end of shaft 331 and is thus always engaged. Secondary rotors 362, 363 and 364 are selectively engaged to be driven by shafts 332, 333 and 334 via clutches 342, 343 and 344, respectively. In this embodiment, these clutches are empty/fill fluid clutches. A pump 350 is engaged with and driven by output shaft 328 via drive shaft 351 and gearbox 354. Variable relief valve 352 governs the output flow of fluid through pump 350 with fluid lines 355, heat exchanger 353 and reservoir 356 completing the fluid circuit. Variable ratio gearbox 320 provides output (shaft 328) to input (shaft 319) ratios of 4:1, 2:1, 1.33:1 and 1:1. Fixed ratio gearbox 330 provides an input to output ratio of approximately 20:1. Microprocessor 360 controls the variable components torque limit clutch 312, clutches 342, 343 and 344, variable ratio gearbox 320 and relief valve 352.

Figure 8:
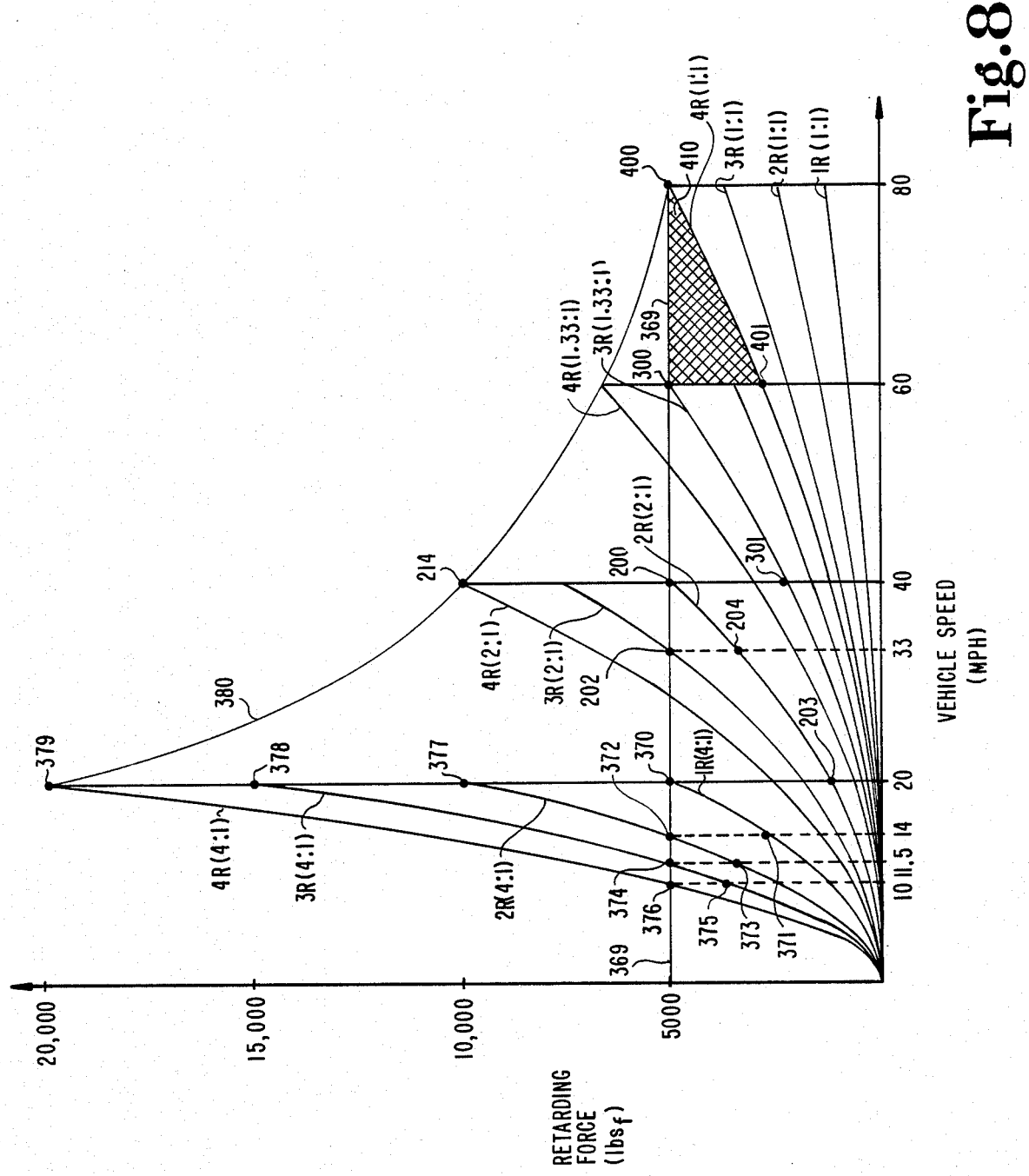
FIG. 8 is a graph illustrating the relationship of speed of the vehicle to braking force produced by the retarder of FIG. 7.

Assuming that the components are sized to produce the values shown in FIG. 8, the rotors, gearboxes, pump, microprocessor and other components operate as follows:

Upon engagement of retarder 310 at a vehicle speed of 20 m.p.h., speed sensor 367 relays signals corresponding to 20 m.p.h. to microprocessor 360 whereupon microprocessor 360 sets the variable ratio gearbox at 4:1. Clutches 342, 343 and 344 are disengaged leaving rotors 362, 363 and 364 idle and rotor 361 fully engaged. The resulting retarding torque produced by rotor 361 transmitted from rotor shaft 331 to input shaft 311 and exerted between wheel 313 and road 305 is 5,000 lbs. represented by point 370 on FIG. 8. As the vehicle slows, the retarding torque to shaft 311 will fall as represented by the one rotor, 4 to 1 curve (1R(4:1)). When the vehicle speed drops to about 14 m.p.h., microprocessor 360 actuates clutch 342 causing engagement of rotor 362. The relationship of output retarding force to vehicle speed is now represented by the two rotor, 4 to 1 (2R(4:1)) curve. The retarding force value shifts from point 371 to point 372, or back up to maximum desired force line 369 (5,000 lbs.). As the vehicle speed drops, the retarding force drops as shown along curve 2R(4:1). When the vehicle speed is about 11.5 m.p.h., microprocessor 360 actuates clutch 343 causing engagement of rotor 363. Now, three rotors, 361, 362 and 363 are all operating with variable ratio gearbox 320 at 4:1. The retarding force as a function of vehicle speed is now represented by curve 3R(4:1), and the retarding force has shifted from the value at point 373 to point 374 on constant force line 369. When the vehicle speed reaches about 10 m.p.h. (point 375), microprocessor 360 actuates the last clutch 344 causing engagement of rotor 364. All four rotors are now engaged with variable ratio gearbox operating at 4:1 and curve 4R(4:1) represents the relationship of retarding force to vehicle speed. Again, the retarding force is at 5,000 lbs. (point 376), and, as the vehicle slows, the retarding force falls along curve 4R(4:1).

Jumping up to the higher speed range, when retarder 310 is engaged at 80 m.p.h., speed sensor 367 relays signals to microprocessor 360 which then actuates clutches 342, 343 and 344 engaging rotors 362, 363 and 364. Microprocessor 360 also commands variable ratio gearbox 320 to operate at a 1:1 ratio. With all four rotors engaged and variable ratio gearbox 320 at a 1:1 ratio, the retarding force to vehicle speed relationship is governed by the 4R(1:1) curve, with the retarding force being on maximum force line 369 at point 400. As vehicle speed slows, the retarding force drops along curve 4R(1:1). When vehicle speed reaches 60 m.p.h. (point 401), microprocessor 360 deactivates clutch 344 causing disengagement of rotor 364 and commands gearbox 320 to shift to a 1.33:1 ratio. The retarding force value shifts from point 401 on curve 4R(1:1) to point 300 on curve 3R(1.33:1). As vehicle speed slows, the retarding force to vehicle speed relationship is represented by curve 3R(1.33:1). When vehicle speed reaches 40 m.p.h. (point 301), microprocessor 360 deactivates clutch 343 causing disengagement of rotor 363 and commands gearbox 320 to shift to a 2:1 ratio. The retarding force shifts from point 301 to point 200 on maximum force line 369 and the retarding force to vehicle speed relationship is now represented by curve 2R(2:1). As the vehicle speed slows, the retarding force approaches the value at point 204. Microprocessor 360 could be programmed to wait until the vehicle speed reaches 20 m.p.h. to reset the components of retarder 310, thus allowing the retarding force to drop to approximately 1,250 lbs (point 203). Alternatively, microprocessor 360 could activate clutch 343 causing engagement of rotor 363 when the vehicle speed reaches about 33 m.p.h. (point 204). With three rotors engaged and gearbox 320 at a 2:1 ratio, the retarding force to vehicle speed relationship would be represented by curve 3R(2:1), and at 33 m.p.h., the retarding force would be at point 202. The retarding force could be allowed to drop along curve 3R(2:1) until the vehicle reaches 20 m.p.h., or microprocessor 360 could engage the fourth rotor at some time before then to bring the retarding force back up to or near the maximum force line of 5,000 lbs.

It can be seen then that appropriate component design of the rotors, fixed ratio stepped up gearbox 330 and variable ratio gearbox 320, and by proper programming of microprocessor 360, a fairly smooth and constant retarding force may be maintained throughout the entire speed range.

The operation of retarder 310 is further enhanced by employment of pump 350. As described previously in connection with pump 60 of FIG. 1, pump 350 may be employed to exert an additional torque onto shaft 328 via shaft 351 and gearbox 354. For example, engagement of retarder 310 at 80 m.p.h. results in a retarding force represented at point 400. As the vehicle slows to 60 m.p.h. (point 401), microprocessor 360 would deactivate clutch 344 thus disengaging rotor 364. It would simultaneously command gearbox 320 to shift to a 1.33:1 ratio. With three rotors 361, 362, 363 engaged and a 1.33:1 ration from gearbox 320, the retarding force to vehicle speed relationship is represented by curve 3R(1.33:1), with the retarding force now at point 300. During the time that the vehicle slowed from 80 m.p.h. to 60 m.p.h., a loss of retarding force was experienced within cross-hatched area 410 bounded by points 401, 300 and 403. The loss of torque associated with the lower speed of rotation of each rotor is made up by pump 350. Monitoring the speed of rotational input via speed sensor 367, microprocessor 360 appropriately modulates relief valve 352, causing pump 350 to exert an additional amount of torque upon shaft 328, and thus bringing the total retarding force up to the desired maximum force represented along line 369. Pump 350 is likewise employed throughout the entire speed range in conjunction with variable ratio gearbox 320 and each of the four rotors to produce a constant retarding force along line 369 or any larger retarding force value desired within the operating capacity of the various components. Values of retarding force below any of the curves of FIG. 8 may be commanded by the above-described shifting.

One advantage of this embodiment over the previous embodiment is the ability to use a much smaller pump thus reducing the weight, size and cost of the entire retarder device. Further, with less work required from pump 350 over pump 60 of FIG. 1, the cooling requirements for the pump fluid are greatly diminished. What cooling is required can be achieved by utilizing the inlet flow of one or more of the rotors in conjunction with heat exchanger 353, which is serially connected within the pump system.

Because the effect of the rotors are additive within fixed ratio gearbox 330, a total retarding force of 20,000 lbs. may be achieved using the rotors heretofore described. For example, at 20 m.p.h. with variable ratio gearbox 320 at 4:1 ratio, each rotor produces a torque corresponding to a retarding force of 5,000 lbs. Thus, with only rotor 361 engaged, the output retarding force would be 5,000 lbs. (point 370). If rotor 362 were also engaged, a retarding force of 10,000 lbs. (point 377) would be produced. Likewise, three rotors would produce a retarding force of 15,000 lbs. (point 378) and four rotors would produce 20,000 lbs. (point 379). Microprocessor 360 will not permit force values above curve 380 so as to prevent overspeeding the rotors used in this embodiment. Thus, with variable ratio gearbox 320 set at 2:1 ratio, and with all four rotors engaged, 10,000 lbs. of retarding force would be achieved when the vehicle is traveling at approximately 40 m.p.h. (point 214). As the vehicle slows, the retarding force will fall along curve 4R(2:1). If desired, the loss in torque associated with a slower rotation of the rotors can be supplemented by pump 350 as described above. The size of pump 350 will of course determine how much additional torque may be added. It can readily be seen that appropriate component sizing and microprocessor programming can produce nearly any desirable retarding force pattern. Also, as with the previous embodiment, driver input 350 is available to provide instantaneous modulation of retarder 310 at the command of the vehicle driver.

Figure 9:
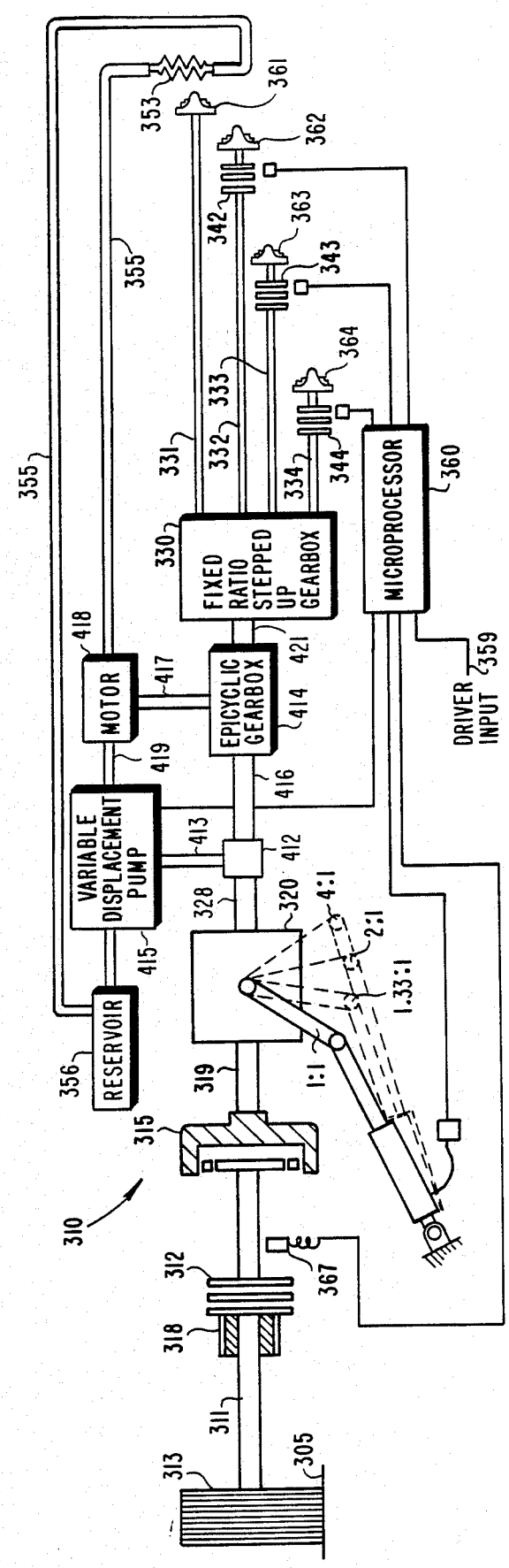
FIG. 9 is a diagrammatic view of the retarder of FIG. 7 with a modification of the pump system and speed ratio control.

In another embodiment, the retarder of FIG. 7 is slightly modified to compensate for the loss of torque due to a dropping input speed. As shown in FIG. 9, standard piston pump 350 (of FIG. 7) is replaced with a conventional variable displacement pump 415.

Output shaft 328 of variable ratio gearbox 320 drives gearbox 412 which has two output shafts 413 and 416. Shaft 416 is one input to epicyclic gearbox 414. The second input 417 to gearbox 414 is provided by fluid motor 418. Motor 418 is driven by output 419 of variable displacement pump 415. Pump 415 receives mechanical rotational input from shaft 413 of gearbox 412. Variable displacement pumps such as pump 415 are well known and can provide a variable displacement output notwithstanding a constant or differently varying input such as from shaft 413. The variable output 419 of pump 415 is governed by signals from microprocessor 360. Fluid lines 355, heat exchanger 353 and reservoir 356 complete the hydraulic circuit of pump 350.

As discussed in the previous embodiment, rotation of one or more rotors (361, 362, 363 and 364) creates a corresponding retarding force upon the vehicle causing the vehicle to slow. As the vehicle slows, the rotational speed of input shaft 319 to gearbox 320 decreases thus providing less rotational input to rotors 361, 362, 363 and 364. The corresponding retarding force therefore drops as shown by the curves of FIG. 8. Input 417 to epicyclic gearbox 414 is thus regulatable by modulating the output of variable displacement pump 415. The result is a precisely modifiable input 421 to fixed ratio gearbox 330 which permits creation of any desired output retarding force. Again, any heat built up within the pump/motor cycle is cooled in heat exchanger 353 by utilizing the input flow of one or more rotors.

Alternative embodiments are provided which include the use of additional rotors. As shown by the retarder system 110 in FIG. 3, any number of rotor/epicyclics may be used. The components of this five rotor system are essentially the same as the two rotor system of FIG. 1 except that only one pump is used and the rotors are smaller. Pump 120 is also smaller than pump 60 of FIG. 1. System 110 can produce a greater aerodynamic retarding horsepower over a broader range of vehicle speed. A retarding torque is again produced by one aerodynamic rotor, (or by two or three, etc. rotors turning freely with respect to one another), with the precise retarding torque being regulated by the control means. In this embodiment, the control means is responsive to a microprocessor (not shown) and includes one aerodynamic rotor, a single pump, a single epicyclic gear train and various clutching and locking mechanisms.

Again connected to a ground engaging wheel 113 is input shaft 111 which is engagable with system 110 by torque limit clutch 112. Sprang clutch 115 is serially engaged between clutch 112 and the remainder of the system to provide anti-skid characteristics. Sprag clutch 115 then drives the first epicyclic gear train which is identical to gear train 40 shown in FIG. 1. One output of E1 is shaft 141 which terminates in rotor 131. The second output of E1 is shaft 151 which is the input of E2. Epicyclic gear train E2, its two output shafts 142 and 152 and rotor 132 are identical to that of E1 and its components, just described, as well as those of successive epicyclic gear trains E3 and E4. Second output 154 of E4 is in direct engagement with rotor 135 by bevel gear 155 and shaft 145. As will become apparent, an infinite number of rotor/epicyclics may be added, limited only by practical considerations such as space, weight and cost.

Encircling each output shaft 141, 142, 143, 144 and 145, and splined to rotate therewith are identical clutch plates 161, 162, 163, 164, and 165, respectively. Clutch plate 161, like the others, is axially slidable along shaft 141 for engagement with encircling gear 166, which is freely rotatable about shaft 141. Gear 166 is in constant meshing engagement with pinion 167 which is rigidly, axial connected to pump shaft 168. Shaft 168 is ultimately, continuously engaged with pump 120 via bevel gears 121 and connecting shafts 122. Each of the other epicyclic output shafts 142, 143 and 144 and shaft 145 are identically engagable with pump 120. Each of the last four shafts 142, 143, 144 and 145 are also provided with the following identical means for being locked with ground. Splined to coaxially, fixedly rotate with shaft 142 is locking disk, 146. Disc 146 is axially slidable along shaft 142 for engagement with an appropriate companion locking mechanism 147 which is fixed to the frame of system 110. Disc 146 and mechanism 147 may lock with each other as by engagement of gear teeth for example.

For urban use, optional direct engagement between input shaft 111 and pump 120 is provided by clutch 160 to produce the maximum braking force within the lowest speed range. Pump 120 may be made regenerative to provide storage of braking energy as previously described which can then be recovered and routed directly to input shaft 111 with torque limit clutch 112 being disengaged.

Figure 4:
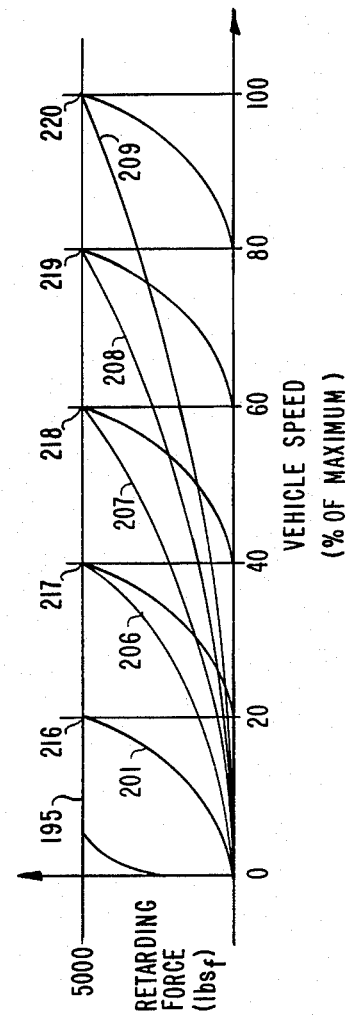
FIG. 4 is a graph illustrating the relationship of speed of the vehicle to braking force produced by the retarder of FIG. 3.
Figure 6:
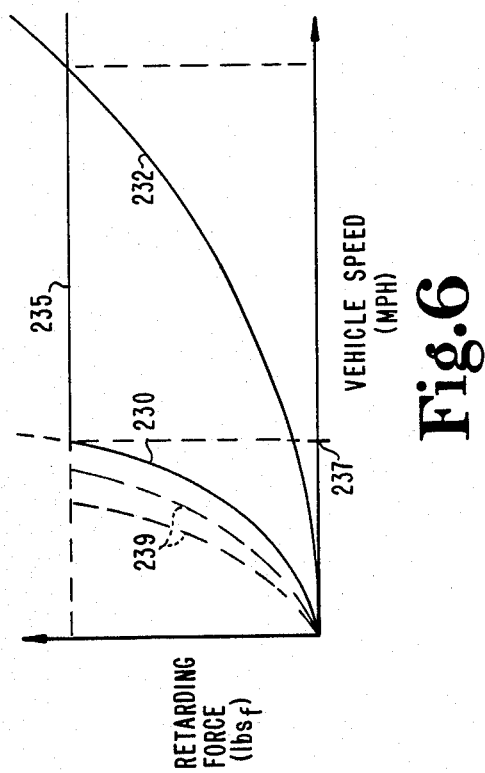
FIG. 6 is a graph illustrating the relationship of speed of the vehicle to braking force produce by the retarder of FIG. 5.

FIG. 4 shows the relationship between the retarding force of system 110 and vehicle speed. Similar to FIG. 2, line 195 represents the maximum desired braking force. Curve 201 represents the force/m.p.h. relationship for a single rotor 131, with each of the other rotors 132, 133, 134 and 135 having an identical relationship. Curve 206 represent both rotors 131 and 132 operating freely with rotors 133, 134 and 135 held idle. Curve 207 represents rotors 131, 132 and 133 operating freely with rotors 134 and 135 idle. Curve 208 represents rotors 131, 132, 133 and 134 rotating freely together with rotor 135 idle, while curve 209 represents all five rotors running freely. For a particular choice of component sizes, with all five rotors running freely, curve 209 will reach the maximum desired braking force at 100% of the maximum intended vehicle speed range. (Point 220) A single rotor 131 will meet the maximum desired braking force line 195 at 20% of maximum vehicle speed, (point 216), two rotors 131 and 132 operating freely will meet it at 40%, (point 217), and so on. A microprocessor (not shown) would be used to modulate all the locking, clutch and pump functions.

Similar to the preferred embodiment shown in FIG. 1, the five-rotor embodiment of FIGS. 3 and 4 would operate as follows:

For speeds between 0 and 20%, rotors 132, 133, 134 and 135 are locked to ground while rotor 131 is free to rotate. Initially, all clutch plates 161–165 are disengaged so that pump 120 sees no input. If system 110 were engaged at 20%, rotors 132–135 would be locked, only rotor 131 would be operating and the retarding force at that moment would be at 216. As the vehicle slows, the retarding force from rotor 131 follows curve 201. Optionally, pump 120 may be engaged by engaging clutch plate 161 against gear 166 to provide the additional retarding force needed to meet line 195 below 20% vehicle speed.

If system 110 were engaged at 40%, rotors 133, 134, and 135 would be locked, rotor 132 would be unlocked, all clutch plates and thus pump 120 would be disengaged and rotors 131 and 132 would turn freely producing a retarding force indicating by point 217. As the vehicle slowed, the retarding force would be along curve 206. Instead, clutch plate 162 is engaged, engaging pump 120, which initially is at zero pressure. As the vehicle speed decreases from 40%, pump pressure of pump 120 is appropriately increased to maintain constant retardation. The sum of the torques from rotor 132 and from pump 120 must be balanced within epicyclic gear train E1 causing the speed of output rotor 131 to remain constant. Rotor 132 speed correspondingly falls. This resulting output of rotor 131 is the retarding torque, which value corresponds with the maximum desired level on line 195. When the vehicle speed reaches 20%, pump pressure reaches a maximum, rotor 132 stops, rotor 131 rotates at full speed at point 216, still on maximum desired force line 195. At this instant, rotor 132 is locked by locking disk 146, clutch plate 162 is disengaged and pump pressure goes to zero. Now retarder system 110 is exactly as described above for engagement at 20% and its operation could continue till 0% is reached.

If system 110 were engaged at 60%, rotors 134 and 135 would be locked, all clutches would be disengaged, pump pressure would be at zero, and rotors 131, 132 and 133 would run freely with the retarding force being on line 195 at point 218. As the vehicle slows, the retarding force would follow curve 207. Instead, clutch plate 163 engages pump 120, which initially is at zero pressure. With the vehicle speed falling from 60%, the pump pressure appropriately increases (as commanded by the microprocessor, not shown). Again, the sum of torques acting on shaft 143 from rotor 133 and from pump 120 must be balanced within E2. Rotors 131 and 132, running at identical speeds through E1 and E2 will be balanced through shaft 152 by the torque of shaft 143 through E3. The result is a retarding force along line 195. As 40% is reached, pump pressure reaches maximum, rotor 133 stops and is locked to ground, clutch plate 163 is disengaged, pump pressure goes to zero, clutch plate 162 is engaged and the retarding force is at point 217. Operation of system 110 below 40% is then as described above.

Operation of system 110 for engagement at 80% is as above except that operation begins with the first four rotors 131, 132, 133 and 134 running freely with rotor 135 locked and with the retarding force being on line 195 at point 219. It can readily be seen that an infinite number of rotors could be used limited only by practical considerations such as cost, size and weight. It is also apparent that the system can be engaged at any speed (64%, for example) with the microprocessor (not shown) engaging, disengaging and setting the proper functions instantaneously to provide the maximum desired retarding force along 195, or to provide any retarding force commanded by the driver.

It should be noted that the transitions among components of retarder system 110 are handled by a microprocessor, (not shown), and, along with torsion coupling 118, torque limit clutch 112 and sprag clutch 115, a smooth operation from engagement to eventual stopping or disengagement is provided.

Figure 3:
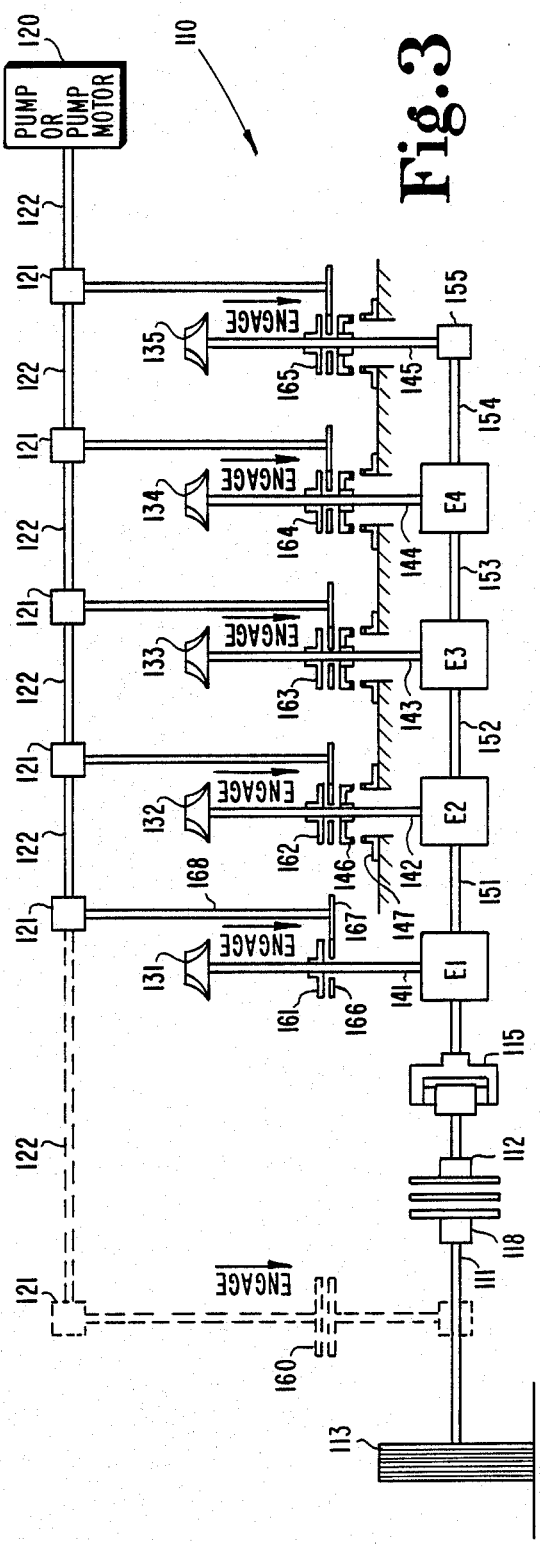
FIG. 3 is a diagrammatic view of a retarder in accordance with another embodiment of the present invention.

Use of three or more rotors is not limited to the mechanical hook-up shown in FIG. 3. Other embodiments are contemplated wherein the bevel gear 121 and connecting shaft 122 design is replaced by an in-line shaft and clutch system. Further, the rotor-epicyclic chain could be connected in a polygonal or cluster configuration, for example.

In another embodiment, variable inlet geometry is applied to the intake of the rotors. By modifying the whirl energy of the inlet air, the energy dissipation of a rotor and thus the retardation level can further be varied.

Figure 5:
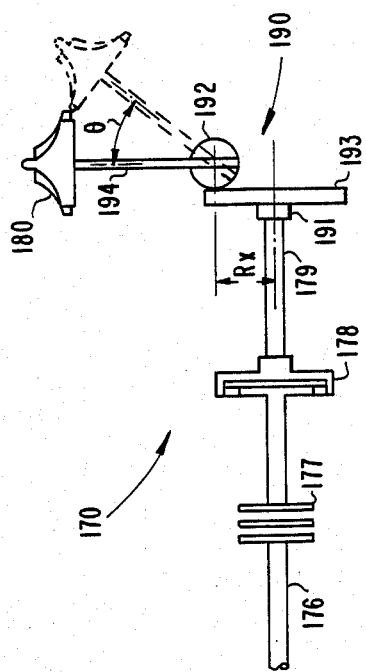
FIG. 5 is a diagrammatic view of a retarder in accordance with another embodiment of the present invention.

In another embodiment shown in FIG. 5, a single aerodynamic rotor 180 is employed to provide the retarding force. As in the preferred embodiment (FIG. 1), a torque limit clutch 177 and sprag clutch 178 are serially connected to selectively provide engagement with input shaft 176 and to provide anti-skid characteristics. The control means for controlling the speed of rotor 180 is provided by variable ratio drive system 190. Such systems are varied and well known. Driven shaft 179 of sprag clutch 178 is rigidly axially connected to rotating drive plate 191. Pivotable drive sphere 192 is rigidly mounted at one end of rotor shaft 194 and is in constant contact with the face 193 of drive plate 191. Rigidly, axially mounted at the opposite end of rotor shaft 194 is rotor 180. With rotor shaft 194 perpendicular to driven shaft 179, the relationship of retarding force to vehicle speed (through retarding system 170) would be along curve 232. If sphere 192, shaft 194 and rotor 180 were pivoted 30 degrees (as shown in phantom), the retarding force would be along curve 230. For certain component sizes, proper modulation of the angle of shaft 194 could then produce a constant retarding force (5,000 lbs., for example) along line 235. The operating range of maximum retard can be further extended at speeds to the left of point 237, by radial movement of sphere 192 away from the center of face 193. By thus increasing the radius of contact $R_x$ to sphere 192, a retarding force at speeds below point 237 may be obtained along curves 239.

Other embodiments are also contemplated wherein a single epicyclic would be used in conjunction with a multi-speed autochange gearbox to vary the input speed. One of the two outputs of the epicyclic would drive and be controlled by a pump. The second output would drive serially connected aerodynamic rotors. Clutching means for engaging/disengaging the rotors as needed would be operated with the other components through a microprocessor to produce a smooth retarding torque over a broad speed range.

Any of the embodiments presented above may be standard equipment or later added options. In either case, they may be integrated directly into the vehicle's transmission or to one or more axles.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for providing a variable retarding torque upon a ground engaging wheel of a vehicle while device is separate from the engine of the vehicle, comprising:

a first aerodynamic rotor;
   clutch means for disengageably engaging said first aerodynamic rotor with the ground engaging wheel; and,
   control means, responsive to independent preselected signals, for continuously varying the ratio of the speed of said first aerodynamic rotor as compared to the speed of the ground engaging wheel.

2. A device for providing a variable retarding torque upon a ground engaging wheel of a vehicle which device is separate from the engine of the vehicle, comprising:
   a first aerodynamic rotor;
   clutch means for disengageably engaging said first aerodynamic rotor with the ground engaging wheel;
   control means, responsive to independent preselected signals, for regulating the ratio of the speed of said first aerodynamic rotor as compared to the speed of the ground engaging wheel; and, wherein the control means includes:
      an epicyclic gear train driven by said clutch means, said gear train having first and second outputs, the first output driving said first aerodynamic rotor,
      a second aerodynamic rotor driven by the second output of said epicyclic gear train, and
      regulating means, connected to the second output, for regulating the speed of rotation of the second output.

3. The device for providing a variable retarding torque of claim 2 where the regulating means includes a pump having a pump output shaft integrally meshing with the second output, said pump being driven by the second output.

4. The device for providing a variable retarding torque of claim 1 wherein the control means is a variable ratio drive system.

5. The device for providing a variable retarding torque of claim 4 wherein the variable ratio drive system includes:
   a drive plate, axially driven by said clutch means, said drive plate having a face;
   a rotor shaft driving said first aerodynamic rotor; and,
   a drive sphere, driven by the face of said drive plate, said sphere rigidly axially mounted to the rotor shaft to rotate about an axis perpendicular to the axis of rotation of said drive plate, said drive sphere, rotor shaft and first aerodynamic rotor pivotable about the center of said sphere and within a
   plane perpendicular to the face of said drive plate.

6. The device for providing a variable retarding torque of claim 1 wherein the control means includes a variable ratio gearbox providing pre-selected input-to-output ratios between the ground engaging wheel and said first aerodynamic rotor.

7. The device for providing a variable retarding torque of claim 6 further including a second gearbox driven by said variable ratio gearbox and having a plurality of gearbox output shafts, and at least one additional aerodynamic rotor, along with said first aerodynamic rotor, each engageable to be driven by one of said plurality of gearbox output shafts.

8. The device for providing a variable retarding torque of claim 7 wherein one of said gearbox output shafts is directly connected to said first aerodynamic rotor, the remaining of said gearbox output shafts each engageable to drive one of said at least one additional aerodynamic rotor via a clutch serially interposed between each of the remaining of said gearbox output shafts and its at least one additional aerodynamic rotor.

9. The device for providing a variable retarding torque of claim 8 further including a pump driven by said variable ratio gearbox and exerting a resistive torque upon said variable ratio gearbox, said pump having a variable relief valve controlling the magnitude of the resistive torque of said pump.

10. The device for providing a variable retarding torque of claim 9 further including microprocessor control means for activating and deactivating the clutches and said clutch means, for governing the input to output ratio of said variable ratio gearbox and for governing the variable relief valve.

11. The device for providing a variable retarding torque of claim 6 further including:
    at least one additional aerodynamic rotor; a variable displacement pump driven by the variable ratio gearbox;
    a motor driven by the variable displacement pump;
    an epicyclic gear train having first and second inputs, the first input being driven by the variable ratio gearbox and the second input being driven by the motor
    a fixed ratio gearbox driven by said epicyclic gear train and having a plurality of gearbox output shafts, one of said gearbox output shafts directly driving said first aerodynamic rotor, the remaining of said gearbox output shafts each engageable to drive one of said at least one additional aerodynamic rotor; and,
    one clutch serially interposed between each of the remaining of said gearbox output shafts and its at least one additional aerodynamic rotor.

12. A device for producing a retarding torque upon a ground engaging wheel of a vehicle, comprising:
    clutch means for engaging and disengaging with the ground engaging wheel;
    two or more aerodynamic rotor means driven by said clutch means for exerting a torque resistive to rotation thereof; and,
    control means engaged with said two or more aerodynamic rotor means for modulating the speed of rotation among said two or more aerodynamic rotor means.

13. The device for producing a retarding torque of claim 12 wherein said control means includes one or more epicyclic gear trains, each epicyclic gear train having one input and first and second outputs.

14. The device for producing a retarding torque of claim 13 wherein the input of one of said one or more epicyclic gear trains is driven by said clutch means and wherein each of said two or more aerodynamic rotor means is axially driven by an output of each of said one or more epicyclic gear trains.

15. The device for producing a retarding torque of claim 14 wherein said one or more epicyclic gear trains are connected serially with one another with the second output of each gear train being the input of the next successive gear train, and wherein one of said two or more aerodynamic rotor means is driven by the second output of the last gear train serially connected.

16. The device for producing a retarding torque of claim 15 wherein said control means further includes pump means for regulating the speed of rotation of at least one of said two or more aerodynamic rotors.

17. The device for producing a retarding torque of claim 16 wherein said aerodynamic rotor means is a rotor having an impeller and an inducer.

18. The device for producing a retarding torque of claim 16 wherein said clutch means includes a torque limiting clutch.

19. The device for producing a retarding torque of claim 18 further including an overrunning clutch serially connected between said torque limiting clutch and said one or more epicyclic gear trains.

20. The device for producing a retarding torque of claim 19 further including regenerative pump means for exerting both a braking torque and an accelerating torque directly upon the ground engaging wheel of the vehicle.

21. The device for producing a retarding torque of claim 18 wherein said clutch means includes a torsional coupling mounted between the torque limit clutch and the ground engaging wheel.

22. The device for producing a retarding torque of claim 16 wherein said aerodynamic rotor means is a centrifugal compressor.

23. A device for producing a variable retarding torque upon a ground engaging wheel of a vehicle, comprising:
- clutch means for engaging and disengaging with the ground engaging wheel of the vehicle;
- an epicyclic gear train having an input shaft driven by said clutch means and having first and second output shafts;
- first aerodynamic rotor means, driven by said first output shaft, for exerting a torque resistive to rotation thereof;
- second aerodynamic rotor means, driven by said second output shaft, for exerting a torque resistive to rotation thereof; and,
- operator controllable control means engaged with said second output shaft for controlling the speed of rotation of said second aerodynamic rotor means.

24. The device for producing a variable retarding torque of claim 23 wherein said control means includes a first hydraulic pump having an output integrally meshing with said second aerodynamic rotor means and having valve means regulating pressure within said pump.

25. The device for producing a variable retarding torque of claim 24 further including first and second modes, said first mode being characterized by the pressure of said pump being at maximum with said pump holding said second aerodynamic rotor means against rotation, said second mode being characterized by the pressure of said pump being zero with said pump permitting free rotation of said second aerodynamic rotor means.

26. The device for producing a variable retarding torque of claim 25, further including an overrunning clutch serially connected between said clutch means and said epicyclic gear train.

27. The device for producing a variable retarding torque of claim 26, further including a regenerative pump/motor disengageably driven by the ground engaging wheel.

28. The device for producing a variable retarding torque of claim 26, wherein said clutch means is a torque-limiting clutch having a torsional coupling.

29. A method for exerting a variable retarding torque upon a ground engaging wheel of a vehicle through the precise dissipation of kinetic energy from the vehicle, comprising the steps of:
- connecting a first aerodynamic rotor in rotary engagement with the ground engaging wheel of the vehicle;
- converting the kinetic energy to work through the acceleration of air with said aerodynamic rotor; and,
- controlling the converting step by modifying and ratio of speed of rotation between the aerodynamic rotor and the ground engaging wheel.

30. The method for exerting a variable retarding torque of claim 29 wherein said connecting step includes serially connecting a variable ratio gearbox between said first aerodynamic rotor and said ground engaging wheel, said variable ratio gearbox driving said aerodynamic rotor.

31. The method for exerting a variable retarding torque of claim 30 further including connecting said variable ratio gearbox to drive a pump, said pump having a variable relief valve for modulating the load required by said variable ratio gearbox to drive said pump.

32. The method for exerting a variable retarding torque of claim 30 wherein said connecting step includes:
- connecting said variable ratio gearbox to drive a variable displacement pump and one input of an epicyclic gearbox;
- connecting said variable displacement pump to drive a motor;
- connecting said motor to drive a second input of said epicyclic gearbox;
- connecting said epicyclic gear box to drive said first aerodynamic rotor; and,
- wherein said controlling step includes modulating said variable displacement pump to control the input to said epicyclic gearbox.

33. The method for exerting a variable retarding torque of claim 30 wherein said controlling step is accomplished by a second aerodynamic rotor and an epicyclic gear train having two outputs, each output driving one of said first and second aerodynamic rotors, and by a pump integrally connected to said second aerodynamic rotor, said pump driven by the output which drives and second aerodynamic rotor.

34. The method for exerting a variable retarding torque of claim 33, further comprising the step of modulating said controlling step so that a constant braking force is exerted upon the vehicle.

35. The method for exerting a variable retarding torque of claim 33, further comprising the step of modulating said controlling step to provide a predetermined and operator variable braking force.

36. A device for providing a variable retarding torque upon a ground engaging wheel of a vehicle which device is separate from the engine of the vehicle, comprising:
- a first aerodynamic rotor having a maximum desired rate of revolutions per minute;
- clutch means for disengageably engaging said first aerodynamic rotor with the ground engaging wheel; and,
- control means, responsive to independent preselected signals, for regulating the ratio of the speed of said first aerodynamic rotor as compared to the speed of the ground engaging wheel, said control means being operable to substantially instantaneously change the speed of said rotor to any value less than the maximum desired rate while the ground engaging wheel is rotating and while said first aerodynamic rotor is engaged with the ground engaging wheel.

37. The device for providing a variable retarding torque upon a ground engaging wheel of claim 36 further including a microprocessor and at least one sensor adapted to send sensor signals to said microprocessor, said microprocessor adapted to send command signals to said control means in response to said pre-selected signals and said sensor signals, said command signals varying the operation of said control means.

38. The device for providing a variable retarding torque upon a ground engaging wheel of claim 36 wherein the control means includes:
an epicyclic gear train driven by said clutch means and driving said first aerodynamic rotor;
a second aerodynamic rotor driven by said epicyclic gear train, and
regulating means, connected to said second aerodynamic rotor for regulating the speed of rotation of said second aerodynamic rotor.

* * * * *

UNITED STATES PATENT AND TRADEMARK OFFICE
CERTIFICATE OF CORRECTION

PATENT NO. : 4,827,798            Page 1 of 2

DATED : May 9, 1989

INVENTOR(S) : Thomas A. Oldfield

It is certified that error appears in the above-identified patent and that said Letters Patent is hereby corrected as shown below:

In column 2, line 7, please change "face" to --fade--.
    In column 2, line 40, please change "in" to --the--.
    In column 3, line 42, please change "produce" to --produced--.
    In column 4, line 48, please change "driven" to --driving--.
    In column 5, line 6, please change "where" to --were--.
    In column 6, line 13, please change "valves" to --values--.
    In column 6, line 34, please change the two occurrences of "mph" to --m.p.h.--.
    In column 7, line 6, please change "braking" to --brake--.
    In column 8, line 36, please insert a dash after "components".
    In column 9, line 40, please insert a period after "lbs".
    In column 10, line 1, please change 362, 363" to --362 and 363--.
    In column 10, line 2, please change "ration" to --ratio--.
    In column 10, line 61, please change "350" to --359--.
    In column 11, line 50, please change "Sprang" to --Sprag--.
    In column 12, line 68, please change "indicating" to --indicated--.
    In column 14, line 60, please change "while" to --which--.
    In column 15, line 26, please change "where" to --wherein--.
    In column 15, lines 47, and 48, "plane" should not begin a new paragraph.

UNITED STATES PATENT AND TRADEMARK OFFICE
CERTIFICATE OF CORRECTION

PATENT NO. : 4,827,798

DATED : May 9, 1989

INVENTOR(S) : Thomas A. Oldfield

It is certified that error appears in the above-identified patent and that said Letters Patent is hereby corrected as shown below:

In column 16, line 15, "a variable" should begin a new paragraph.
    In column 16, line 22, please insert ";" after --motor--.
    In column 18, line 7, please change "and" to --the--.
    In column 18, line 44, please change "and" to --said--.

Signed and Sealed this

Nineteenth Day of June, 1990

Attest:

HARRY F. MANBECK, JR.

*Attesting Officer*      *Commissioner of Patents and Trademarks*